United States Patent [19]

Miura et al.

[11] Patent Number: 5,849,434
[45] Date of Patent: Dec. 15, 1998

[54] NON-AQUEOUS ELECTROLYTE LITHIUM SECONDARY BATTERY

[75] Inventors: Hitoshi Miura; Atsushi Terahara; Katsuhiko Iwasaki; Kenichiro Kami; Taketsugu Yamamoto, all of Ibaraki, Japan

[73] Assignee: Sumitomo Chemical Company, Limited, Osaka, Japan

[21] Appl. No.: 685,562

[22] Filed: Jul. 24, 1996

[30] Foreign Application Priority Data

Jul. 24, 1995 [JP] Japan .................................. 7-187054

[51] Int. Cl.⁶ ............................................ H01M 4/64
[52] U.S. Cl. ................................. 429/217; 429/218
[58] Field of Search ............................. 429/212, 215, 429/217, 218

[56] References Cited

U.S. PATENT DOCUMENTS

| | | | |
|---|---|---|---|
| 4,416,915 | 11/1983 | Palmer et al. | 427/126.3 |
| 4,542,444 | 9/1985 | Boland | 361/433 |
| 4,835,075 | 5/1989 | Tajima et al. | 429/194 |
| 4,882,110 | 11/1989 | Kramer et al. | 264/63 |
| 4,902,589 | 2/1990 | Dahn et al. | 429/94 |
| 5,130,380 | 7/1992 | Carew | 525/343 |
| 5,212,622 | 5/1993 | MacFarlane et al. | 361/305 |
| 5,378,560 | 1/1995 | Tomiyama | 429/217 |
| 5,415,958 | 5/1995 | Takahashi et al. | 429/217 |
| 5,482,795 | 1/1996 | Chaloner-Gill | 429/192 |
| 5,496,663 | 3/1996 | Walk et al. | 429/218 |
| 5,563,284 | 10/1996 | Koga et al. | 429/217 |

FOREIGN PATENT DOCUMENTS

| | | |
|---|---|---|
| 0510236 | 10/1992 | European Pat. Off. . |
| 5-190209 | 7/1993 | Japan . |
| 5-275077 | 10/1993 | Japan . |
| 7-134989 | 5/1995 | Japan . |
| 7-201357 | 8/1995 | Japan . |

OTHER PUBLICATIONS

Polymer Letters, vol. 7, 1969, pp. 287–292 (no month available).

Inoue et al., "Copolymerization of Carbon Dioxide and Epoxide with Organometallic Compounds", *Die Makromolekulare Chemie,* vol. 130 (Nr. 3170), 1969, pp. 210–220 (no month available).

Patent Abstracts of Japan, vol. 011, No. 206 (C–422), Jul. 3, 1987.

Patent Abstracts of Japan, vol. 11, No. 273 (C–445), Sep. 4, 1987.

Patent Abstracts of Japan, vol. 16, No. 150 (E–1189), Apr. 14, 1992.

J.R. Owen et al., "Composiste Electrodes" in Fast Ionic Transport in Solids, Bates et al.,eds. North–Holland Publishing, pp. 343–346 (no month available), 1981.

*Primary Examiner*—Kathryn L. Gorgos
*Assistant Examiner*—Carol Chaney
*Attorney, Agent, or Firm*—Sughrue, Mion, Zinn, Macpeak & Seas, PLLC

[57] ABSTRACT

A non-aqueous electrolyte lithium secondary battery, comprising a cathode containing, as active material, a material that can be doped/undoped with lithium ions, an anode containing, as active material, a carbonaceous material that can be doped/undoped with lithium ions, a separator interposed between the cathode and anode and an electrolyte prepared by dissolving lithium salt in an organic solvent, wherein the anode contains a polymer having carbonate groups represented by the structural formula [I]:

$$-\mathrm{O}-\underset{\underset{\mathrm{O}}{\|}}{\mathrm{C}}-\mathrm{O}- \qquad [\mathrm{I}]$$

said polymer having a number average molecular weight of not less than 300 and not more than 200,000. The lithium secondary battery has cycle life and high-rate capacity which are improved without reducing low-temperature capacity.

5 Claims, No Drawings

NON-AQUEOUS ELECTROLYTE LITHIUM SECONDARY BATTERY

FIELD OF THE INVENTION

The present invention relates to a non-aqueous electrolyte lithium secondary battery.

BACKGROUND OF THE INVENTION

Recently, lithium secondary batteries using carbonaceous materials as an anode active material, which is improved in cycle life, appeared in place of lithium secondary batteries using a lithium metal or alloys as an anode which have a problem in cycle life. Thus, the lithium secondary batteries were put into practical use, first, as secondary batteries for portable electric apparatuses such as portable telephone, portable video camera, etc. However, the electric capacity is gradually deteriorated by repeating charging/discharging and cycle life is not long enough. Therefore, further improvement has been required.

In the lithium batteries using carbonaceous materials for anode, the solvent and the solute for non-aqueous electrolyte are consumed by a chemical reaction which forms compounds on the anode surface, resulting in an increase of overpotential. It is considered that cycle efficiency of the lithium batteries using carbonaceous materials for anode is reduced by the accumulation of the compounds on the anode surface, a change in structure of the electrode active materials in the battery and deterioration of adhesion properties in the electrodes.

In the lithium secondary battery, improvements in electrolyte system have hitherto been conducted for the purpose of attaining longer cycle life. For example, the cycle efficiency can be improved by containing ethylene carbonate (hereinafter referred to as "EC", sometimes) as an ingredient of the electrolyte solvent when using graphite carbon as the anode active material, and the improvement is put to practical use.

However, EC increases the viscosity of the electrolyte and decreases the conductivity, because EC has a melting point higher than room temperature. Therefore, the presence of EC can reduce the preferable properties such as high-rate capacity and low-temperature capacity. The presence of EC can also cause an increase in overpotential, which leads to low cycle efficiency of battery.

SUMMARY OF THE INVENTION

An object of the present invention is to provide a lithium secondary battery whose cycle life and high-rate capacity are improved without reducing low-temperature capacity.

Under the circumstances above mentioned, the present inventors have intensively studied to improve cycle efficiency and high-rate efficiency of lithium secondary battery. As a result, it has been found that cycle efficiency and high-rate efficiency of the lithium secondary battery can be improved by using an anode wherein a polymer material having carbonate group is contained. Thus, the present invention has been accomplished.

That is, the present invention includes the following inventions:

(1) A non-aqueous electrolyte lithium secondary battery, comprising a cathode containing, as active material, a material that can be doped/undoped with lithium-ions, an anode containing, as active material, carbonaceous material that can be doped/undoped with lithium ions, a separator interposed between the cathode and the anode, and an electrolyte prepared by dissolving lithium salt in an organic solvent, wherein the anode contains a polymer having carbonate groups represented by the structural formula [I]:

said polymer having a number average molecular weight of not less than 300 and not more than 200,000;

(2) The non-aqueous electrolyte lithium secondary battery described in the above-mentioned paragraph (1), wherein 50 % or more of the total number of the carbonate groups contained are in the main chain of the polymer;

(3) The non-aqueous electrolyte lithium secondary battery described in the above-mentioned paragraph (1), wherein more than 50 % of the total number of the carbonate groups contained are in the side chains of the polymer;

(4) The non-aqueous electrolyte lithium secondary battery described in the above-mentioned paragraph (2), wherein the polymer contains a chemical structure represented by the structural formula [II]:

wherein $R_1$, $R_2$, $R_3$ and $R_4$ independently indicate a hydrogen atom, an alkyl group having not more than 10 carbon atoms, an aralkyl group having not more than 10 carbon atoms, an aryl group having not more than 10 carbon atoms or a haloalkyl group having not more than 10 carbon atoms;

(5) The non-aqueous electrolyte lithium secondary battery described in the above-mentioned paragraph (4), wherein the polymer comprises a repeating unit represented by the structural formula [III]:

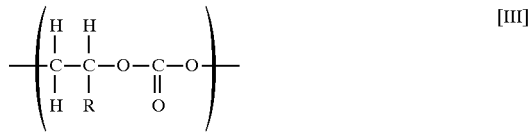

wherein R indicates an alkyl group having not more than 10 carbon atoms;

(6) The non-aqueous electrolyte lithium secondary battery described in the above-mentioned paragraph (4), wherein $R_1$, R2, R3 and R4 are hydrogen atoms;

(7) The non-aqueous electrolyte lithium secondary battery described in the above-mentioned paragraph (4), wherein the polymer comprises a repeating unit represented by the structural formula [IV]:

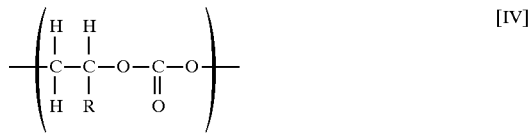

DETAILED DESCRIPTION OF THE INVENTION

The present invention will be explained in detail, hereinafter.

Firstly, the anode in the present invention may be those obtained as following. A carbonaceous material is used as active material that can be doped/undoped with lithium ions. The carbonaceous material is mixed with a polymer having carbonate groups represented by the structural formula [I] and, if necessary, a suitable binder (e.g. polyethylene, polypropylene, fluororesin, etc.) and a conductive material. The resultant mixture is made into a paste and is coated on a current collector, which is then dried and pressed so that the mixture is adhered to the current collector.

The number average molecular weight of the polymer is preferably from 300 to 200,000, more preferably from 1,000 to 150,000.

The amount of said polymer is from about 0.1 to 15 parts by weight, more preferably 1 to 12 parts by weight, and the total amount of said polymer and the binder is from 0.1 to 20 parts by weight, more preferably from 1 to 15 parts by weight, based on 100 parts by weight of the total amount of the carbon powder used in the anode.

As the polymer, those in which 50 % or more of the carbonate groups contained are in the main chain are preferred. Particularly, those which contain a chemical structure represented by the structural formula [I] are more preferred. Among them, those wherein all $R_1$, R2, R3 and R4 indicate a hydrogen atom are more preferred.

Moreover, a polymer comprising a repeating unit represented by the general formula [III] is preferred. Above all, polyethylene carbonate comprising a repeating unit represented by the general formula [IV] is particularly preferred.

The polyethylene carbonate in the present invention is obtained, for example, by a method of alternating copolymerization of ethylene oxide and carbon dioxide using a catalyst, as described in Polymer Letters, vol.7, page 287 (1969) or Makromol. Chem., vol.130, page 210 (1969).

Examples of the carbonaceous material which can be doped/undoped with lithium ions in the present invention include natural graphite, artificial graphite, cokes, carbon black, vapor-grown carbons, carbon fibers, materials obtained by carbonizing organic polymer compounds, etc., and composite materials comprising these carbonaceous materials as main ingredient and mixtures thereof. It is particularly preferred that a graphitic carbonaceous material is contained because the charge/discharge capacity per unit weight is large and the average potential during charging/discharging is low.

Materials contained in the graphitic carbonaceous materials may be natural graphite or artificial graphite. Examples of the natural graphite include graphite produced in Sri Lanaka, graphite produced in Madagascar, flaky graphite produced in Korea, earthy graphite produced in Korea, graphite produced in the People's Republic of China, etc. The above natural graphites may also be heated, processed or modified. Examples of the artificial graphite include graphitized product of cokes, graphitized product of mesocarbon microbeads, graphitized product of mesophase pitch carbon fibers, etc.

Examples of the active materials contained in the cathode as the material which can be doped/undoped with lithium ions in the present invention include lithium transition metal oxides with layered structure, having a so-called $\alpha$-NaFeO$_2$ type structure in which lithium ions are regularly arranged in a layered manner, transition metal oxides or lithium transition metal oxides having a spinel structure, transition metal chalcogenides, etc. Among them, the lithium transition metal oxides with layered structure having an $\alpha$-NaFeO$_2$ structure are particularly preferred because high voltage and high energy density are obtained and cycle property is also excellent.

Examples of the cathode in the present invention include those obtained as following: A material as the active material which can be doped/undoped with lithium ions is mixed with a suitable binder (e.g. polyethylene, polypropylene, fluororesin, etc.) and conductive material powder, and the resultant mixture is made into a paste and is coated on a current collector, which is then dried and pressed so that the mixture is adhered to the current collector. The conductive material powder may be those which have a conductive effect and low chemical reactivities with the non-aqueous electrolyte used and the cathode used. Examples thereof include graphite powder, carbon black, coke powder, conductive polymers, etc.

Examples of the lithium transition metal oxides with layered structure having an $\alpha$-NaFeO$_2$ structure include lithium transition metal oxides which contain at least one transition metal selected from the group consisting of vanadium, manganese, iron, cobalt, nickel, etc., more preferably the group consisting of cobalt and nickel. Among them, the lithium transition metal oxides with layered structure whose main component is lithium nickel oxide are particularly preferred because of the excellent cycle property.

As the lithium salt in the present invention, there can be used any one of those which have hitherto been known, and examples thereof include LiClO$_4$, LiPF$_6$, LiAsF$_6$, LiBF$_4$, LiCF$_3$SO$_3$, LiN(SO$_2$CF$_3$)$_2$, LiN(SO$_2$C$_2$F$_5$)$_2$ etc. Among them, LiPF$_6$, LiBF$_4$, LiN(SO$_2$CF$_3$)$_2$ and LiN(SO$_2$C$_2$F$_{b\ 5}$)$_2$ are preferred because of the high electric conductivity.

The electrolyte in the present invention contains at least one sort of the above lithium salts and dissolves the lithium salt within the concentration range from 0.1M (mol/l) to 2M. The concentration range from 0.5M to 1.5M is particularly preferred.

Examples of the separator in the present invention include micro-porous films of fluororesin and olefin resin (e.g. polyethylene, polypropylene, etc.), and nonwoven fabrics of fluororesin, olefin resin (e.g. polyethylene, polypropylene, etc.) and nylon.

EXAMPLES

The following Examples further illustrate the present invention in detail but are not to be construed to limit the scope thereof.

The cathode of the lithium secondary battery tested was obtained by the method described hereinafter.

As a cathode active material, powder of lithiated nickel dioxide containing gallium was prepared by mixing lithium nitrate, basic nickel carbonate and gallium nitrate (Li:Ni:Ga =1.05:0.98:0.02) and firing in an oxygen stream at 660° C. for 15 hours. To 87% by weight of the cathode active material powder, 1% by weight of acetylene black having a number average primary particle size of 40 nm [manufactured by Denkikagaku Kogyo Co., Ltd., trade name: DENKA BLACK, 50% pressed product] and 9% by weight of scaly artificial graphite having a weight average particle size of 7.2 $\mu$m [manufactured by Ronza Co., trade name: KS15] were added and mixed. To the resultant mixture, 3% by weight of polyvinylidene fluoride [manufactured by Kureha Kagaku Kogyo Co., Ltd., trade name: KF#1300] in N-methylpyrrolidone as a solvent was added as the binder, followed by sufficiently kneading to form a paste.

It was confirmed by X-ray powder diffraction that the above lithiated nickel dioxide containing gallium has an $\alpha$-NaFeO2 structure. After the paste was coated on an aluminum foil having a thickness of 20 μm as the current collector, the coated foil was dried and pressed to form into a sheet, which was cut into small pieces in size of 1.3 ×1.8 cm to obtain cathodes. The weight of active material of each of these cathodes is from 40 to 45 mg.

As the separator, a micro-porous polypropylene film [manufactured by Daiseru Kagaku Co., Ltd., trade name: CELLGUARD #2400] was used.

The carbon powder for anode was obtained using natural graphite powder, pseudo-graphitic carbon black powder, and silane coupling agent, by the method described hereinafter. The natural graphite powder used occurred in Madagascar, which was heat-treated at 3,000C, and have a specific surface area of 9 $m^2/g$ according to a nitrogen adsorption method, a number-average particle size of 10 μm, a true density of 2.26, an interlayer spacing $d_{002}$ of 3.36 Å in X-ray powder diffraction and an ash content of 0.05% by weight. The pseudo-graphitic carbon black powder used was manufactured by Tokai Carbon Co., Ltd., whose trade name is TB3800, which was graphitized at 2,800° C., and have a specific surface area of 30 $m^2/g$ according to a nitrogen adsorption method, a true density of 2.04 and a number average primary particle size of 66 nm. To 95 parts by weight of the natural graphite powder, 5 parts by weight of the pseudo-graphite carbon black powder was added and mixed to obtain a mixed carbon material. To the mixed carbon material, 1 part by weight of silane coupling agent [manufactured by Nippon Yunicar Co., Ltd., trade name: A186] which was previously dispersed in high purity water was added, followed by sufficiently mixing and further vacuum-drying at 150°0C. to obtain silane coupling-agent treated carbon powder.

The cycle efficiency and the high-rate efficiency of the discharge capacity of a resultant battery were examined by alternatively repeating the following experiments (1) and (2) at room temperature.

(1) A constant current and voltage charging was conducted under the condition of a current density of 3.3 $mA/cm^2$, a charging maximum voltage of 4.24 V and a charging time of 3 hours, and then discharging was conducted under the condition of a current density of 0.66 $mA/cm^2$ and a final voltage of 2.75 V. This charging/discharging is conducted consecutively two times.

(2) A constant current and voltage charging was conducted under the condition of a current density of 3.3 $mA/cm^2$, a charging maximum voltage of 4.24 V and a charging time of one hour, and then discharging was conducted under the condition of a current density of 3.3 $mA/cm^2$ and a final voltage of 2.75 V. This charging/discharging is conducted consecutively 20 times.

Cycle efficiency: A value obtained by dividing a discharge capacity in the 90th charging/discharging by that in the second charging/discharging was taken as the cycle efficiency. The higher the cycle efficiency, the longer the cycle life.

High-rate efficiency: A value obtained by dividing a discharge capacity in the 3rd charging/discharging by that in the second charging/discharging was taken as the high-rate efficiency. The higher the high-rate efficiency, the higher the high-rate capacity.

Example 1

To 90% by weight of the above silane coupling agent-treated carbon powder, 2% by weight of polyethylene carbonate (hereinafter referred to as "PEC", sometimes) having number average molecular weight of 50,000 dissolved in N-methylpyrrolidone as a solvent and 8% by weight of polyvinylydene fluoride dissolved in N-methylpyrrolidone as a solvent were added as the binder, followed by sufficiently kneading to form a paste.

After the paste was coated on a copper foil having a thickness of 10 μm as the current collector, the coated foil was dried and pressed to form into a sheet, which was cut into small pieces in size of 1.5 ×2 cm to obtain an anode containing PEC.

A non-aqueous electrolyte was prepared by dissolving $LiPF_6$ as the electrolyte salt in dimethyl carbonate (hereinafter referred to as "DMC", sometimes) as the electrolyte solvent to 1 mol/liter. The above cathode and the anode containing PEC obtained as described above were sandwiched with a separator. The non-aqueous electrolyte and the sandwiched electrodes with separator were put in a container made of stainless steel to produce a battery A1. The charging/discharging of this battery was conducted under the condition as described above.

The observed results of cycle efficiency and high-rate efficiency are shown in Table 1.

Comparative Example 1

To 90% by weight of the above silane coupling agent-treated carbon powder, 10% by weight of polyvinylydene fluoride dissolved in N-methylpyrrolidone as a solvent was used as the binder, followed by sufficiently kneading to form a paste. After the paste was coated on a copper foil having a thickness of 10 μm as the current collector, the coated foil was dried and pressed to form into a sheet, which was cut into small pieces in size of 1.5 ×2 cm to obtain an anode containing no PEC.

The above cathode and the anode containing no PEC were sandwiched with a separator. A non-aqueous electrolyte having the same composition as that of Example 1 and the sandwiched electrodes with separator were put in a container made of stainless steel to produce a battery R1. The charging/discharging of this battery was conducted under the same condition as that of Example 1.

The observed results of cycle efficiency and high-rate efficiency are shown in Table 1.

Example 2

A non-aqueous electrolyte was prepared by dissolving $LiPF_6$ as the electrolyte salt in a mixed solvent of DMC and ethyl methyl carbonate (hereinafter referred to as "EMC", sometimes) (volume ratio: 1:1) as the electrolyte solvent to 1 mol/liter. The cathode and the anode containing PEC prepared according to the same manner as that described in Example 1 were sandwiched with a separator. The non-aqueous electrolyte and the sandwiched electrodes with separator were put in a container made of stainless steel to produce a battery A2.

The charging/discharging of this battery was conducted under the same condition as that of Example 1.

The observed results of cycle efficiency and high-rate efficiency are shown in Table 1.

Comparative Example 2

The cathode and the anode containing no PEC prepared according to the same manner as that described in Comparative Example 1 were sandwiched with a separator. A non-aqueous electrolyte having the same composition as that of Example 2 and the sandwiched electrodes with separator were put in a container made of stainless steel to produce a battery R2.

The charging/discharging of this battery was conducted under the same condition as that of Example 1.

The observed results of cycle efficiency and high-rate efficiency are shown in Table 1.

Example 3

A non-aqueous electrolyte was prepared by dissolving $LiPF_6$ as the electrolyte salt in a mixed solvent of EC, DMC and EMC (volume ratio: 30:35:35) as the electrolyte solvent to 1 mol/liter. The cathode and the anode containing PEC prepared according to the same manner as that described in Example 1 were sandwiched with a separator. The non-aqueous electrolyte and the sandwiched electrodes with separator were put in a container made of stainless steel to produce a battery A3.

The charging/discharging of this battery was conducted under the same condition as that of Example 1.

The observed results of cycle efficiency and high-rate efficiency are shown in Table 1.

Comparative Example 3

The cathode and the anode containing no PEC prepared according to the same manner as that described in Comparative Example 1 were sandwiched with a separator. A non-aqueous electrolyte having the same composition as that of Example 3 and sandwiched electrodes with separator were put in a container made of stainless steel to produce a battery R3.

The charging/discharging of this battery was conducted under the same condition as that of Example 1.

The observed results of cycle efficiency and high-rate efficiency are shown in Table 1.

TABLE 1

| | Battery | PEC in anod | Electrolyte solvent | Cycle efficiency | High-rate efficiency |
|---|---|---|---|---|---|
| Example 1 | A1 | Contained | DMC | 0.83 | 0.76 |
| Comparative Example 1 | R1 | Not contained | DMC | 0.80 | 0.70 |
| Example 2 | A2 | Contained | DMC + EMC | 0.87 | 0.71 |
| Comparative Example 2 | R2 | Not contained | DMC + EMC | 0.68 | 0.45 |
| Example 3 | A3 | Contained | EC + DMC + EMC | 0.76 | 0.64 |
| Comparative Example 3 | R3 | Not contained | EC + DMC + EMC | 0.77 | 0.60 |

As is apparent from Table 1, when the electrolyte solvent contains no EC, the batteries A1 and A2 of the present invention are remarkably superior to the batteries R1 and R2 in cycle efficiency. When the electrolyte solvent contains EC, the cycle efficiency of the battery A3 of the present invention is almost the same with that of-the battery R3. Furthermore, the batteries A1 and A2 have higher cycle efficiencies than the batteries A3 and R3. The batteries A1, A2 and A3 of the present invention are improved in high-rate efficiency in comparison with the batteries R1, R2 and R3, respectively.

In a lithium secondary battery using a conventional anode which contains no PEC, the cycle efficiency at room temperature is good (battery R1) when using DMC as the electrolyte solvent. However, it can not be used practically because the electrolyte is solidified at the low-temperature range within a normal operation range of the battery. It is possible to make it difficult to solidify the electrolyte by adding an asymmetric non-cyclic carbonate such as EMC to DMC. Thereby, the practicality can be improved. On the other hand, the battery wherein the above asymmetric non-cyclic carbonate is added as an ingredient of the electrolyte solvent has lower cycle efficiency (battery R2). It is possible to reduce the loss of cycle efficiency by further adding EC to the electrolyte (battery R3). However, preferable properties such as high-rate capacity, low-temperature capacity, etc. are reduced by adding EC because the melting point of EC is high and the viscosity is high.

In the anode according to the present invention and lithium secondary battery using the same, the cycle efficiency and the high-rate efficiency are improved in comparison with a lithium secondary battery using a conventional anode when the liquid electrolyte contains no EC. In the anode according to the present invention and lithium secondary battery using the same, when the liquid electrolyte contains EC, the cycle efficiency is not reduced and the high-rate efficiency is improved in comparison with a lithium secondary battery using a conventional anode and containing EC as an ingredient of the electrolyte solvent.

Thereby, there can be provided a lithium secondary battery having a long cycle life and excellent high-rate capacity, and an industrial value thereof is extremely large.

What is claimed is:

1. A non-aqueous electrolyte lithium secondary battery, comprising a cathode containing, as active material, a material that can be doped/undoped with lithium ions, an anode containing, as active material, carbonaceous material that can be doped/undoped with lithium ions, a separator interposed between the cathode and the anode, and an electrolyte prepared by dissolving lithium salt in an organic solvent, wherein the anode contains a polymer having carbonate groups represented by the structural formula [I]:

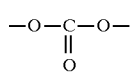

said polymer having a number average molecular weight of not less than 300 and not more than 200,000, wherein the polymer contains a chemical structure represented by the structural formula [I]:

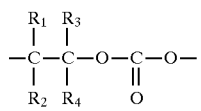

wherein $R_1$, $R_2$, $R_3$, and $R_4$ independently indicate a hydrogen atom, an alkyl group having not more than 10 carbon atoms, an aralkyl group having not more than 10 carbon atoms, an aryl group having not more than 10 carbon atoms or a haloalkyl group having not more than 10 carbon atoms.

2. A non-aqueous electrolyte lithium secondary battery according to claim 1, wherein 50 % or more of the total number of the carbonate groups contained are in the main chain of the polymer.

3. A non-aqueous electrolyte lithium secondary battery according to claim 1, wherein the polymer comprises a repeating unit represented by the structure formula [II]:

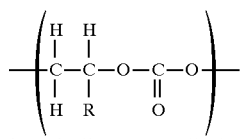

wherein R indicates an alkyl group having not more than 10 carbon atoms.

4. A non-aqueous electrolyte lithium secondary battery according to claim 1, wherein $R_1$, $R_2$, $R_3$ and $R_4$ are hydrogen atoms.
5. A non-aqueous electrolyte lithium secondary battery according to claim 1, wherein the polymer comprises a repeating unit represented by the structural formula [V]:
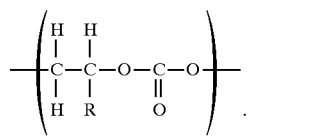
[IV]

UNITED STATES PATENT AND TRADEMARK OFFICE
CERTIFICATE OF CORRECTION

PATENT NO. : 5,849,434
DATED : Dec. 15, 1998
INVENTOR(S) : Hitoshi Miura, et al

It is certified that error appears in the above-identified patent and that said Letters Patent is hereby corrected as shown below:

Col. 8, line 42, change "formula [I]" to --formula [II]--.

Col. 8, line 59, change "formula [II]" to --formula [III]--.

Col. 9, line 8, change "formula [V]" to --formula [IV]--.

Signed and Sealed this

Twenty-fourth Day of April, 2001

*Attest:*

NICHOLAS P. GODICI

*Attesting Officer*     Acting Director of the United States Patent and Trademark Office